United States Patent
Boyko

(10) Patent No.: US 6,854,250 B2
(45) Date of Patent: Feb. 15, 2005

(54) VARIABLE OFFSET ROTARY MOWER APPARATUS

(76) Inventor: Stanley Joseph Boyko, Box 1062, R.R. #1, Wakaw, Saskatchewan (CA), S0K 4P0

( * ) Notice: Subject to any disclaimer, the term of this patent is extended or adjusted under 35 U.S.C. 154(b) by 0 days.

(21) Appl. No.: 10/274,560

(22) Filed: Dec. 17, 2002

(65) Prior Publication Data

US 2003/0140610 A1 Jul. 31, 2003

(30) Foreign Application Priority Data

Jan. 25, 2002 (CA) .............................................. 2369907
Jun. 3, 2002 (CA) .............................................. 2388742

(51) Int. Cl.[7] .............................................. A01D 34/64
(52) U.S. Cl. ...................................... 56/14.9; 56/15.8
(58) Field of Search .............................. 56/10.7, 14.9, 56/15.1, 15.2, 15.3, 15.5, 15.8, 6

(56) References Cited

U.S. PATENT DOCUMENTS

| 3,527,032 | A | * | 9/1970 | Wood ............................... 56/6 |
| 4,183,195 | A | * | 1/1980 | James ........................ 56/11.9 |
| 4,835,952 | A | * | 6/1989 | McLane ..................... 56/17.2 |
| 4,869,056 | A | * | 9/1989 | Lynch ........................ 56/15.2 |
| 4,986,064 | A | * | 1/1991 | Ermacora .................... 56/228 |
| 5,375,398 | A | * | 12/1994 | McClymonds .............. 56/15.2 |
| 5,511,368 | A | * | 4/1996 | Kocher ........................ 56/15.2 |
| 5,537,808 | A | * | 7/1996 | Dallman ..................... 56/15.2 |
| 5,642,607 | A | * | 7/1997 | Stephenson et al. ......... 56/15.1 |
| 5,957,475 | A | * | 9/1999 | Pearen et al. ............... 280/409 |
| 6,044,633 | A | * | 4/2000 | Stiefvater et al. ........ 56/16.4 R |
| 6,138,445 | A | * | 10/2000 | Toth ........................... 56/15.5 |
| 6,199,355 | B1 | * | 3/2001 | Stiefvater et al. ........... 56/14.9 |

* cited by examiner

Primary Examiner—Robert E. Pezzuto
Assistant Examiner—Alicia Torres
(74) Attorney, Agent, or Firm—Patterson, Thuente, Skaar & Christensen, P.A.

(57) ABSTRACT

A rotary mower apparatus comprises a mower deck with a plurality of rear wheels mounted behind the mower deck and at least one front wheel mounted ahead of the mower deck such that the mower deck rides along the ground on the wheels. A floating hitch member is pivotally attached at one end to a top portion of the mower deck so as to pivot about a substantially vertical mower axis, and is adapted for pivotal attachment at an opposite end to the tractor about a substantially vertical tow axis. The attachment further allows the mower deck to float with respect to the tractor to follow contours of the ground. A drive is operative to transfer power from the tractor to rotate the cutting blade, and a mower angle control is operative to selectively pivot the floating hitch member about the vertical mower axis with respect to the mower deck.

29 Claims, 11 Drawing Sheets

VARIABLE OFFSET ROTARY MOWER APPARATUS

This invention is in the field of rotary mowers and in particular such mowers that travel in a path offset from the towing vehicle.

BACKGROUND

Mowers and cutters for cutting vegetation are of various types. Non-crop vegetation such as grass and weeds is most often cut with a rotary mower, where a cutting blade element rotates under a deck to cut and chop the vegetation. The cutting blade element can be a large blade rotating about its midpoint, or can be a disc with blades pivotally mounted thereon so as to reduce damage when striking an obstacle. Numerous variations of cutting blade elements are known.

Rotary mowers often include two, three, or more mower decks mounted side by side. The decks are offset fore and aft to provide the required overlap from the rotating blade under one deck to that of the adjacent deck, and the outside decks, or wings, fold upward to allow for transport. Such wider rotary mowers are most often of the trailing type, wherein the mower is supported by wheels behind the decks and by the hitch of the towing tractor. Such a winged rotary mower is disclosed in U.S. Pat. No. 5,343,683 to Friesen.

Although single deck mowers of the trailing type are common, such smaller rotary mowers are often mounted on the three-point hitch of a tractor, such that the whole mower can be lifted off the ground by the tractor. When operating near the ground, the rear of these mounted mowers is supported by a castering wheel. Such a mounted mower is disclosed in U.S. Pat. No. 4,195,860 to Helams.

Rotary mowers are preferred for such applications as cutting the vegetation in the ditches along roads, since the vegetation is chopped up and dispersed, leaving a neat appearance. With conventional mowers following directly behind the tractor, the tractor travels on the slope of the ditch. Often these ditches slope sharply down from the road, making travel thereon unsafe.

Some small degree of offset can be provided for trailing rotary mowers by moving the tractor drawbar to one side, an adjustment commonly available on tractors. For mounted rotary mowers, an offset is provide in the Helams '860 hitch, and as well in the hitch of U.S. Pat. No. 6,138,445 to Toth. In all cases the degree of offset is too small to allow a tractor to remain on the road while cutting the ditch.

U.S. Pat. No. 5,957,475 to Pearen et al. provides an intermediate offset hitch apparatus that is hitched to the tractor on one side so as to tow behind the tractor. A rotary mower is hitched to the Pearen et al. apparatus at the rear of the opposite side. A pair of gearboxes and drive shafts connects the power take-off shaft of the tractor to the mower. The apparatus essentially provides a hitching location for the mower that is a clone of the tractor hitch itself, but offset sufficiently to allow the tractor to remain on the road while the mower cuts the slope of the ditch. The offset distance is not variable, and the apparatus must be removed in order to tow the mower directly behind the tractor.

SUMMARY OF THE INVENTION

It is an object of the present invention to provide a rotary mower apparatus adapted for attachment to a tractor such that the mower apparatus follows a path offset from the path of the tractor.

It is a further object of the present invention to provide such a rotary mower apparatus wherein the amount of offset can be conveniently varied. It is a further object of the present invention to provide such a rotary mower apparatus incorporating a mechanical driveline to transfer power from the tractor to rotate the cutting blade element. It is a further object of the present invention to provide such a rotary mower apparatus having a plurality of mower decks.

The present invention provides, in one aspect, a rotary mower apparatus adapted for attachment to a tractor for towing along the ground in an operating travel direction. The apparatus comprises a mower deck with a plurality of rear wheels mounted behind the mower deck and at least one front wheel mounted ahead of the mower deck such that the mower deck rides along the ground on the wheels. A cutting blade element is rotatably mounted under the mower deck so as to rotate about a substantially vertical blade axis. A floating hitch member is pivotally attached at a mower end thereof to a top portion of the mower deck so as to pivot about a substantially vertical mower axis, and is adapted for pivotal attachment at a tow end thereof to the tractor about a substantially vertical tow axis. The attachment at the ends of the floating hitch member further allow the floating hitch member and mower deck to float with respect to the tractor to follow contours of the ground. A drive is adapted for connection to the tractor and is operative to transfer power from the tractor to rotate the cutting blade element, and a mower angle control is operative to selectively pivot the floating hitch member about the vertical mower axis with respect to the mower deck.

In a second aspect the present invention provides a wing-type rotary mower apparatus adapted for attachment to a tractor for towing along the ground in an operating travel direction. The apparatus comprises a central mower deck and right and left wing mower decks pivotally attached to respective right and left sides of the central mower deck. A plurality of rear wheels is mounted behind the mower decks and at least one front wheel is mounted to a front end of the central mower deck such that the mower decks ride along the ground on the wheels. A cutting blade element is rotatably mounted under each mower deck so as to rotate about right, left, and central substantially vertical blade axes. A floating hitch member is pivotally attached at a mower end thereof to a top portion of the central mower deck so as to pivot about a substantially vertical mower axis, and is adapted for pivotal attachment at a tow end thereof to the tractor about a substantially vertical tow axis. The attachment at the ends of the floating hitch member further allow the floating hitch member and mower decks to float with respect to the tractor to follow contours of the ground. A drive is adapted for connection to the tractor and is operative to transfer power from the tractor to rotate the cutting blade elements, and a mower angle control is operative to selectively pivot the floating hitch member about the vertical mower axis with respect to the central mower deck.

Thus front and rear wheels support the mower deck, and the floating hitch member allows the deck to float to follow ground contours. The mower deck is guided into the desired offset path by selectively pivoting the floating hitch member about the vertical mower axis with respect to the mower deck. A driveline is conveniently provided by a driveshaft having a rotational axis coincidental with the vertical mower axis. The rotational axis of the driveline can coincide with that of the cutting blade element, or coincide with the input of a gearbox having an output connected to rotate one or more cutting blade elements.

The wheels of the apparatus can be mounted such that the rear end of the central mower deck can pivot from side to side while the front end is maintained substantially fixed with respect to the front wheels. This orientation reduces the chance of interference of the wheels with the floating hitch member. The wheels can also be mounted on rubber torsion suspension members to provide a smoother ride for the mower with a much simpler mechanism than is provided in conventional mowers.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1–4 illustrate a simple single deck rotary mower apparatus 1 of the invention adapted for attachment to a tractor for towing along the ground in an operating travel direction T. The apparatus 1 comprises a mower deck 3 with rear wheels 5 mounted behind the mower deck 3 and a front wheel 7 mounted ahead of the mower deck 3. The mower deck 3 rides along the ground on the wheels 5, 7. A cutting blade element which is conventional and not illustrated is rotatably mounted under the mower deck 3 so as to rotate about a substantially vertical blade axis BA.

Figure 1:
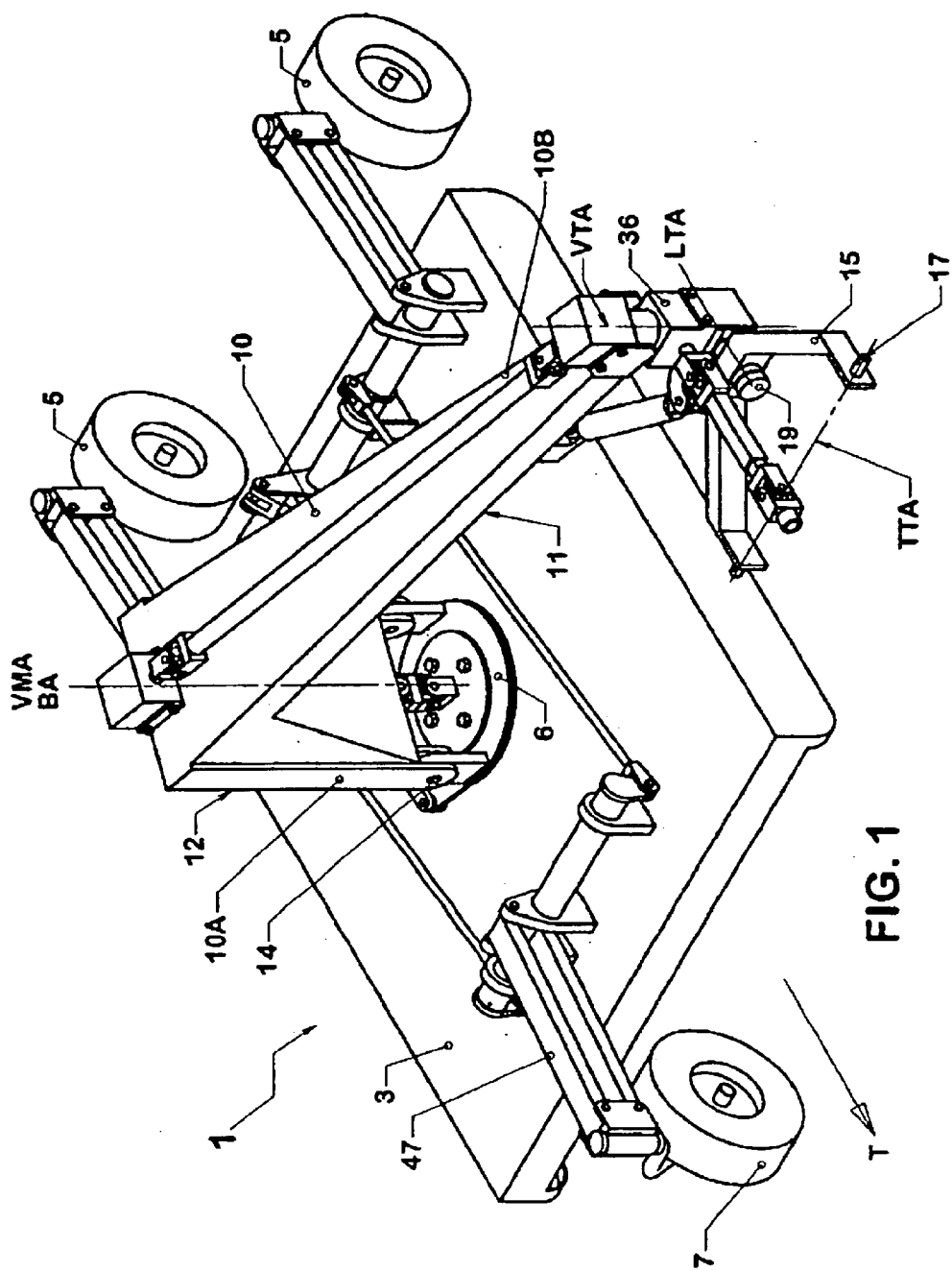
FIG. 1 is a front perspective view of a single deck embodiment of the invention in a maximum offset position.
Figure 2:
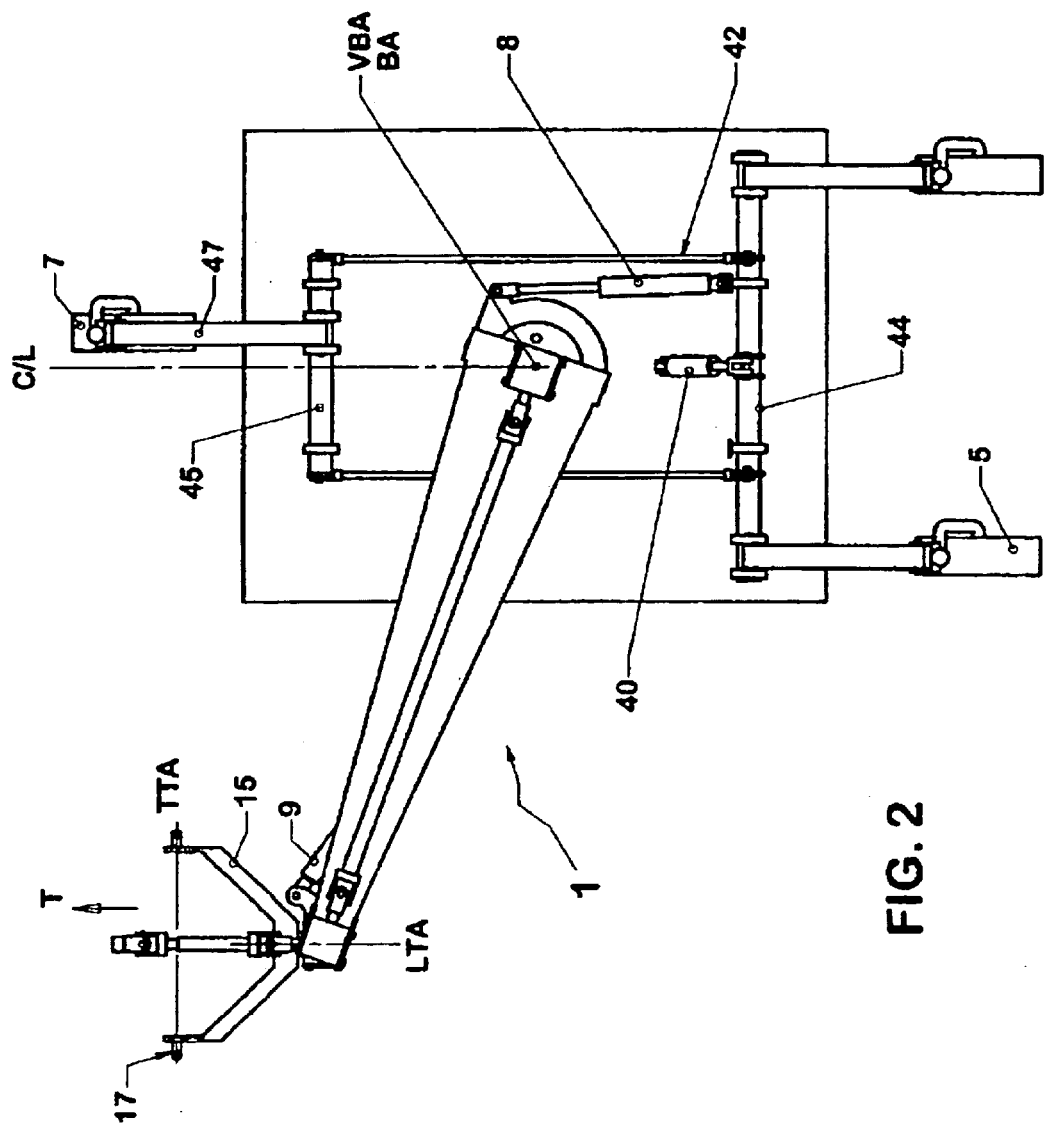
FIG. 2 is a top view of the embodiment of FIG. 1 in the position of FIG. 1.
Figure 3:
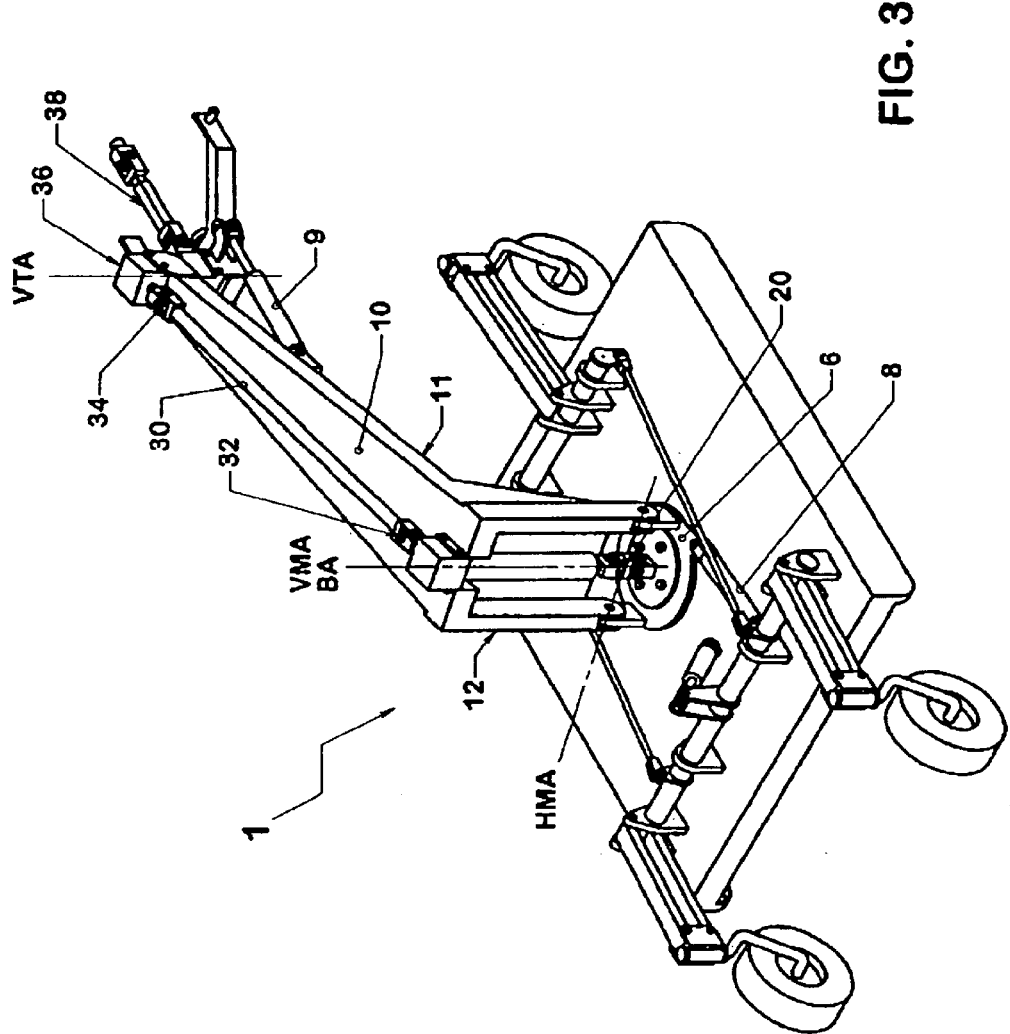
FIG. 3 is a rear perspective view of the embodiment of FIG. 1 in a minimum offset position.
Figure 4:
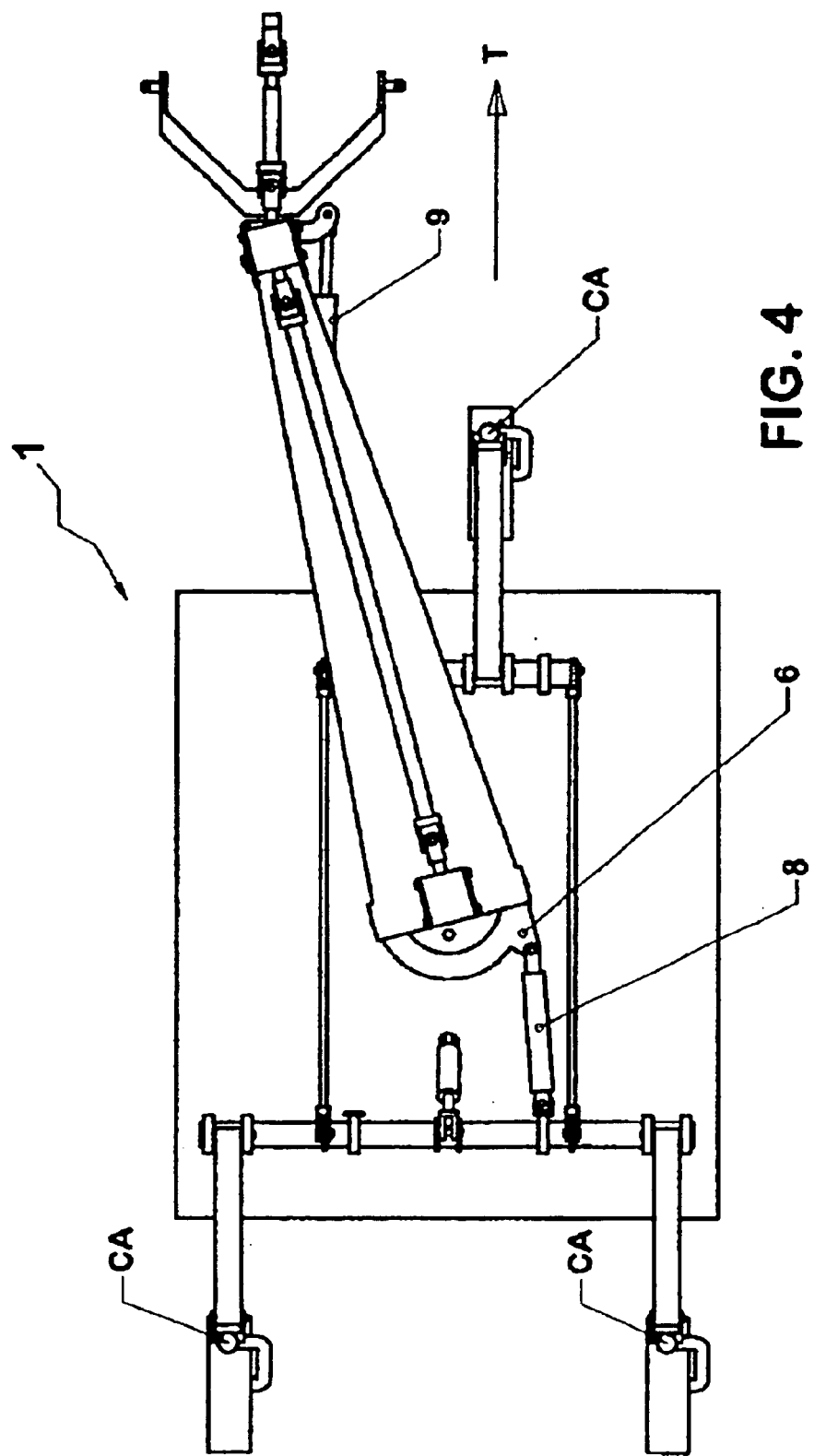
FIG. 4 is a top view of the embodiment of FIG. 1 in the position of FIG. 3.

A floating hitch member 10 is pivotally attached at a mower end 10A thereof via pivot plates 6 to a top portion of the mower deck 3 so as to pivot about a substantially vertical mower axis VMA. The floating hitch member 10 comprises a horizontal portion 11 and a vertical portion 12 which acts to raise the horizontal portion 11 to allow the floating hitch member 10 to pivot about the vertical mower axis VMA above the mower deck 3. The floating hitch member 10 is adapted for pivotal attachment at a tow end 10B thereof to the tractor about a substantially vertical tow axis VTA. A mower angle control, illustrated as mower hydraulic cylinder 8, is operative to selectively pivot the floating hitch member 10 about the vertical mower axis VMA with respect to the mower deck 3. The illustrated embodiment also includes a hitch hydraulic cylinder 9 slaved to the mower hydraulic cylinder 8 such that they move in and out together. The added force exerted on the floating hitch member 10 by this hitch hydraulic cylinder 9 facilitates moving the mower deck 3 to the position as illustrated in FIG. 2, where the floating hitch member 10 is substantially perpendicular to the operating travel direction T. The hydraulic cylinders 8, 9 are oriented and configured to move the mower deck 3 through a range of offset positions between that illustrated in FIG. 2 and that illustrated in FIG. 4. Other configurations can be used to provide different ranges.

Figure 6:
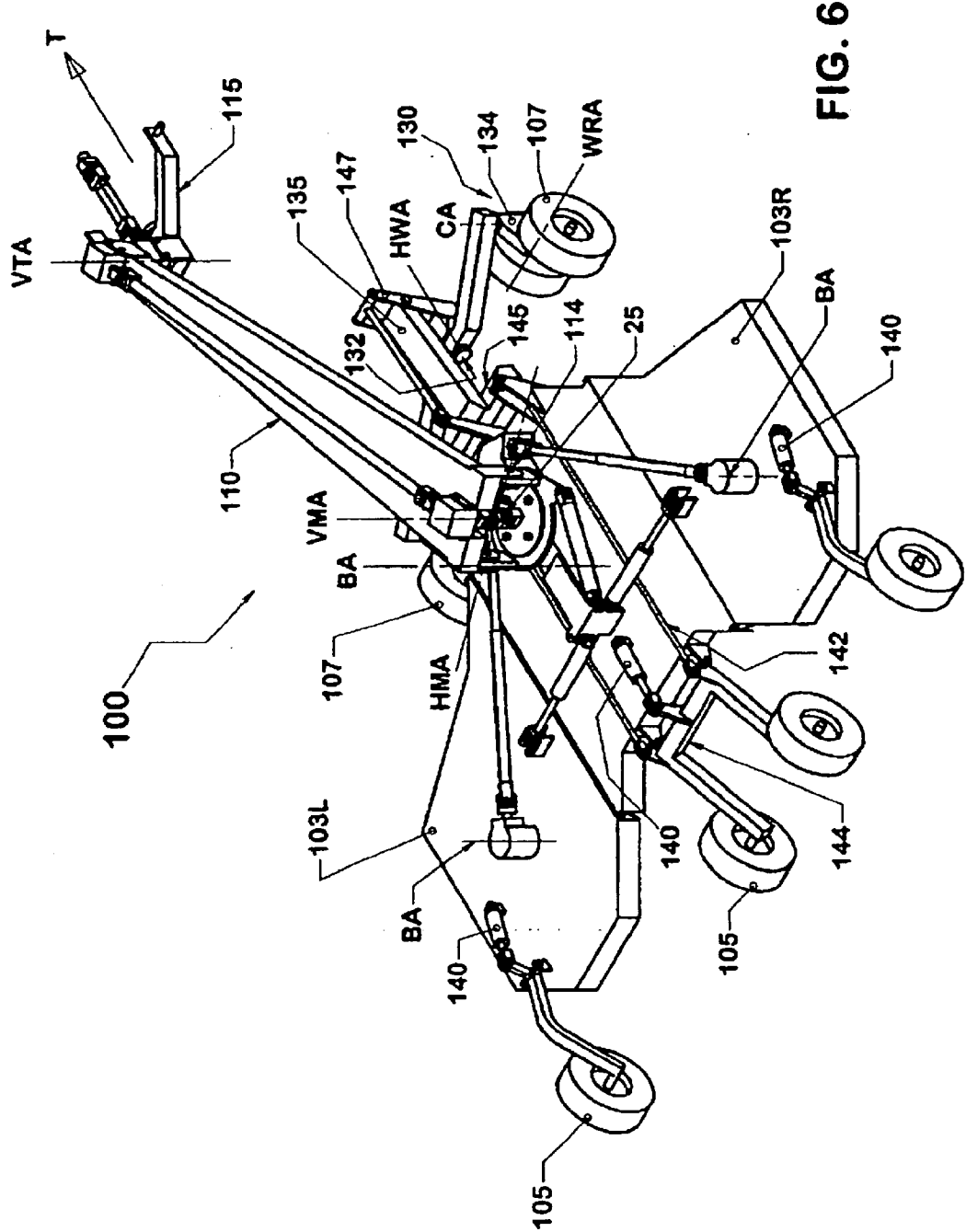
FIG. 6 is a rear perspective view of a triple deck embodiment of the invention in a minimum offset position.
Figure 7:
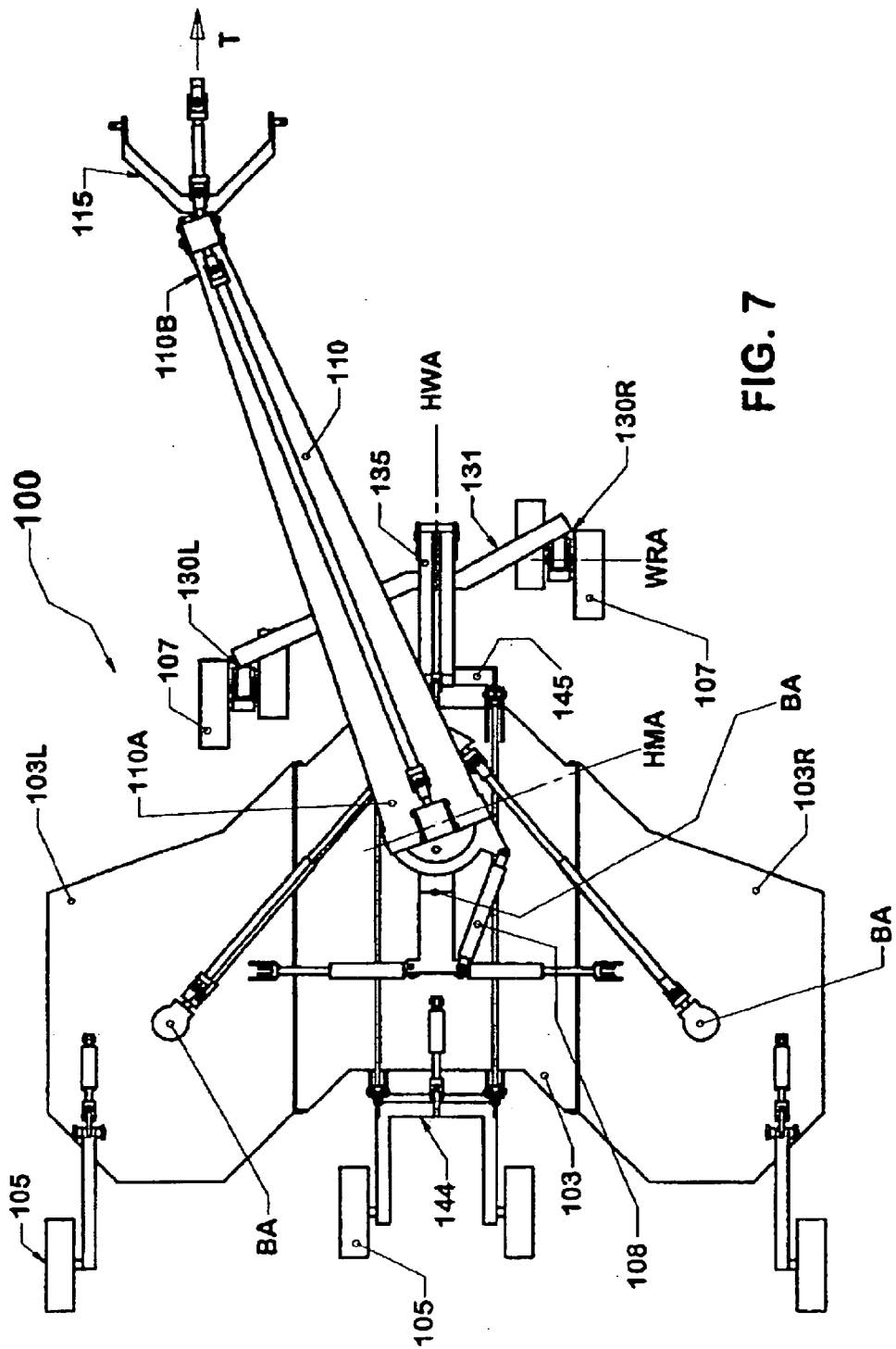
FIG. 7 is a top view of the embodiment of FIG. 6 in the position of FIG. 6.

In the embodiment of FIGS. 1–4, the front and rear wheels all caster about vertical caster axes CA so that the position of the mower deck 3 relative to the tractor is dictated by the position of the hydraulic cylinders 8, 9. With only a single mower deck 3, the apparatus 1 is light enough to be manipulated into the position of FIG. 2 by a reasonably sized tractor. With a larger apparatus, such as is illustrated in FIGS. 6 and 7, the hitch hydraulic cylinder 9 is removed and the multiple deck apparatus is guided by the fixed rear wheels 105 as the floating hitch member 110 is pivoted by the mower hydraulic cylinder 108, while the apparatus 100 pivots freely about the vertical tow axis VTA.

The attachment at the ends 10A, 10B further allows the floating hitch member 10 and mower deck 3 to float with respect to the tractor to follow contours of the ground. The mower end 10A is also pivotally attached to the mower deck 3 about a substantially horizontal mower axis HMA oriented transversely to the floating hitch member 10. The axis HMA is provided by pins 14. At the opposite tow end 10B, the horizontal portion 11 of the floating hitch member 10 is attached to a tractor attachment adaptor 15 that provides a substantially horizontal longitudinal tow axis LTA oriented substantially parallel to the operating travel direction T, and a substantially horizontal transverse tow axis TTA oriented substantially perpendicular to the operating travel direction T. Pins 17 pass through holes in the ends of the conventional hitch arms of a tractor to provide axis TTA, and tow shaft 19 rotates to provide axis LTA. Thus the mower deck 3 can move with respect to the tractor to follow the ground.

A drive is adapted for connection to the tractor and operative to transfer power from the tractor to rotate the cutting blade element. A mechanical drive is incorporated in the embodiment of FIGS. 1–4. Alternatively, the drive could be a hydraulic drive, requiring only connection of flexible hydraulic lines from the tractor to a hydraulic motor mounted on the mower deck 3.

Figure 5:
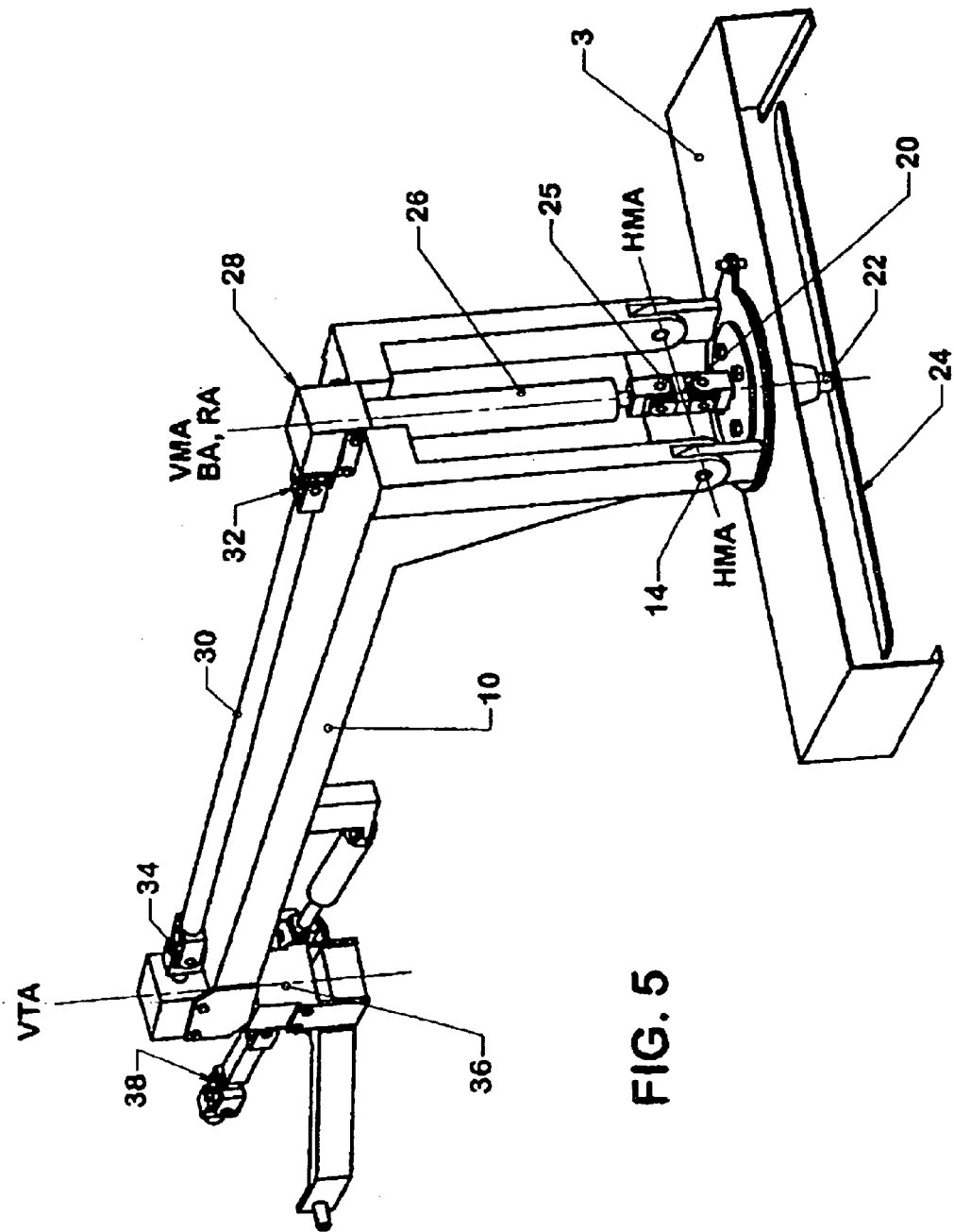
FIG. 5 is a schematic rear perspective view of the mechanical drive line of the embodiment of FIG. 1.

In the embodiment of FIGS. 1–4, the horizontal mower axis HMA intersects the vertical mower axis VMA at an intersection point 20 above the mower deck 3, as illustrated in FIG. 5. This configuration allows for the convenient provision of a driveline to connect a power shaft of the tractor to the cutting blade element.

As schematically illustrated in FIG. 5, the driveline comprises a lower vertical drive shaft 22 having a rotational axis RA coincidental with the vertical mower axis VMA. The lower vertical drive shaft 22 is operatively connected at a bottom end thereof to the cutting blade element 24. A direct in-line connection is illustrated in FIG. 5, such that the rotational axis RA of the lower vertical drive shaft 22 coincides with the rotational axis of the cutting blade element BA. Alternatively, the axes RA and BA could be separated, and the connection made through further gearboxes or the like.

An upper vertical drive shaft 26 is connected at a bottom end thereof to a top end of the lower vertical drive shaft 22 by a double universal joint 25. The horizontal mower axis HMA is located substantially in the center of the double universal joint 25.

The top end of the upper vertical drive shaft 26 is connected to an output end of an angle gearbox 28 attached to the floating hitch member 10. The double universal joint 25 allows for connection of the upper and lower drive shafts 22, 26 where the alignment is imperfect, and the location of the horizontal mower axis HMA at the center of the double universal joint 25 allows proper operation of the drive when the mower deck 3 pivots about the horizontal mower axis HMA with respect to the gearbox 28 and attached floating hitch member 10.

A lateral drive shaft 30 is connected at a mower end thereof to an input end of the angle gearbox 28 by a universal joint 32. The lateral drive shaft 30 is substantially aligned with the floating hitch member 10 and is adapted at a tow end thereof for pivotal connection via primary shaft 38 to a power output shaft of the tractor through another universal joint 34 and stacked gearboxes 36 which pivot with respect to each other about the vertical tow axis VTA.

The embodiment of FIGS. 1–4 further comprises an actuator 40 operative to move the rear wheels 5 up and down to thereby raise and lower a rear end of the mower deck 3. Linkage arms 42 connect the rear rockshaft 44 and the front rockshaft 45 so that the front and rear wheels 7,5 and the front and rear ends of the mower deck 3 move up and down substantially in concert. The front wheel 7 is also mounted on a parallel linkage 47 such that the caster axis CA of the front wheel 7 is maintained substantially vertical as the mower deck 3 moves up and down, maintaining optimum performance of the castering front wheel 7 as the mower deck 3 moves up and down.

Figure 8:
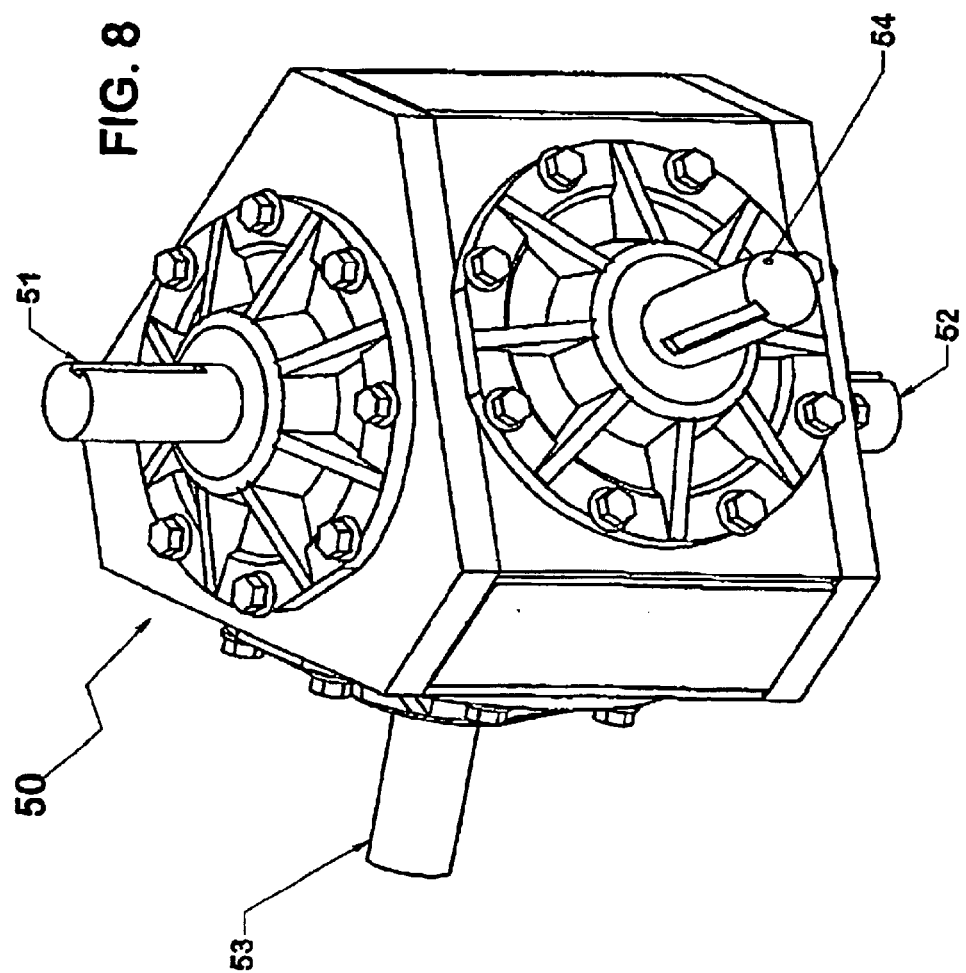
FIG. 8 is a perspective view of an alternate gearbox for driving three mower decks.

The vertical mower axis VMA is located on a center-line CL of the mower deck 3 in order to pull in the center of the load and prevent skewing and unnecessary torque on the pivot plates 6. The vertical mower axis VMA is also illustrated coinciding with the cutting blade element's rotational axis BA, however the two axes VMA, BA could be separated in other embodiments if convenient. Where multiple cutting blade elements are driven, as illustrated in FIGS. 6 and 7, it may be convenient to drive a gearbox with the lower shaft 22, and run driveshafts to each cutting blade element. Where a lower gearbox 50 as illustrated in FIG. 8 is mounted on the central mower deck 103 with the top shaft 51 in line with the vertical driveline, the cutting blade element of the central mower deck 103 can be driven with the lower shaft 52, and the right and left wing decks 103R, 103L can be driven with horizontal shafts 53, 54.

FIGS. 6 and 7 illustrate an alternate triple deck rotary mower apparatus 100 adapted for attachment to a tractor for towing along the ground in an operating travel direction T. The apparatus comprises a central mower deck 103, and right and left wing mower decks 103R, 103L pivotally attached to respective right and left sides of the central mower deck 103.

Rear wheels 105 are mounted behind the mower decks 103, 103R, 103L and front wheels 107 are mounted to a front end of the central mower deck 103 such that the mower decks 103, 103R, 103L ride along the ground on the wheels 105, 107. A cutting blade element is rotatably mourned under each mower deck 103, 103R, 103L so as to rotate about right, left, and central substantially vertical blade axes BA.

A floating hitch member 110 is pivotally attached at a mower end 110A thereof via pivot plates 106 to a top portion of the central mower deck 103 so as to pivot about a substantially vertical mower axis VMA above the mower deck 103. The floating hitch member 110 is adapted for pivotal attachment at a tow end 110B thereof to the tractor about a substantially vertical tow axis VTA. A mower angle control, illustrated as mower hydraulic cylinder 108, is operative to selectively pivot the floating hitch member 110 about the vertical mower axis VMA with respect to the mower deck 103. The hydraulic cylinder 108 is oriented and configured to move the mower deck 103 through a range of offset positions between that illustrated in FIG. 7 and a more offset position that is not illustrated. For a reasonable sized tractor, the greatest offset will be a position wherein the angle of the floating hitch member 110 is somewhat less than perpendicular to the operating travel direction T. The configurations can be changed to provide a desired range.

In the embodiment of FIGS. 6 and 7, the front wheel sets 130, and wheels 107, caster about vertical caster axes CA, however the rear wheels 105 are fixed in rolling alignment with the operating travel direction T. The apparatus is guided by the fixed rear wheels 105 as the floating hitch member 110 is pivoted by the mower hydraulic cylinder 108, while the apparatus 1 pivots freely about the vertical tow axis VTA.

The attachment at the ends 110A, 110B further allows the mower deck 103 to float with respect to the tractor to follow contours of the ground. The mower end 110A is also pivotally attached to the mower deck 103 about a substantially horizontal mower axis HMA oriented transversely to the floating hitch member 110. The axis HMA is provided by pins 114. At the opposite tow end 10B, the floating hitch member 110 is attached to a tractor attachment adaptor 115 that is the same as that described above for the embodiment of FIGS. 1–4.

The embodiment of FIGS. 6 and 7 is much heavier than the earlier discussed single deck apparatus, and thus requires more wheels to support the front end. The rear ends of the wings are supported by the illustrated addition of a wheel behind each wing deck 103R, 103L. The weight of the front ends of the wing decks 103R, 103L is however transferred to the central mower deck 103 and must be carried by the front wheels 107.

The front end of the central mower deck 103 is supported by tandem wheel sets 130 attached to opposite ends of a walking beam 131. The walking beam 131 is pivotally attached to the front end of the central mower deck 103 about a substantially horizontal walking axis HWA oriented substantially parallel to the operating travel direction T. The axis HWA is provide by shaft 132. The horizontal walking axis HWA, as well as vertical mower axis VMA are located in substantially the center of the central mower deck 103 where the hitch of a conventional trailing mower would normally be located to carry the weight of the front end of the apparatus 100 and provide the required towing force.

Figure 9:
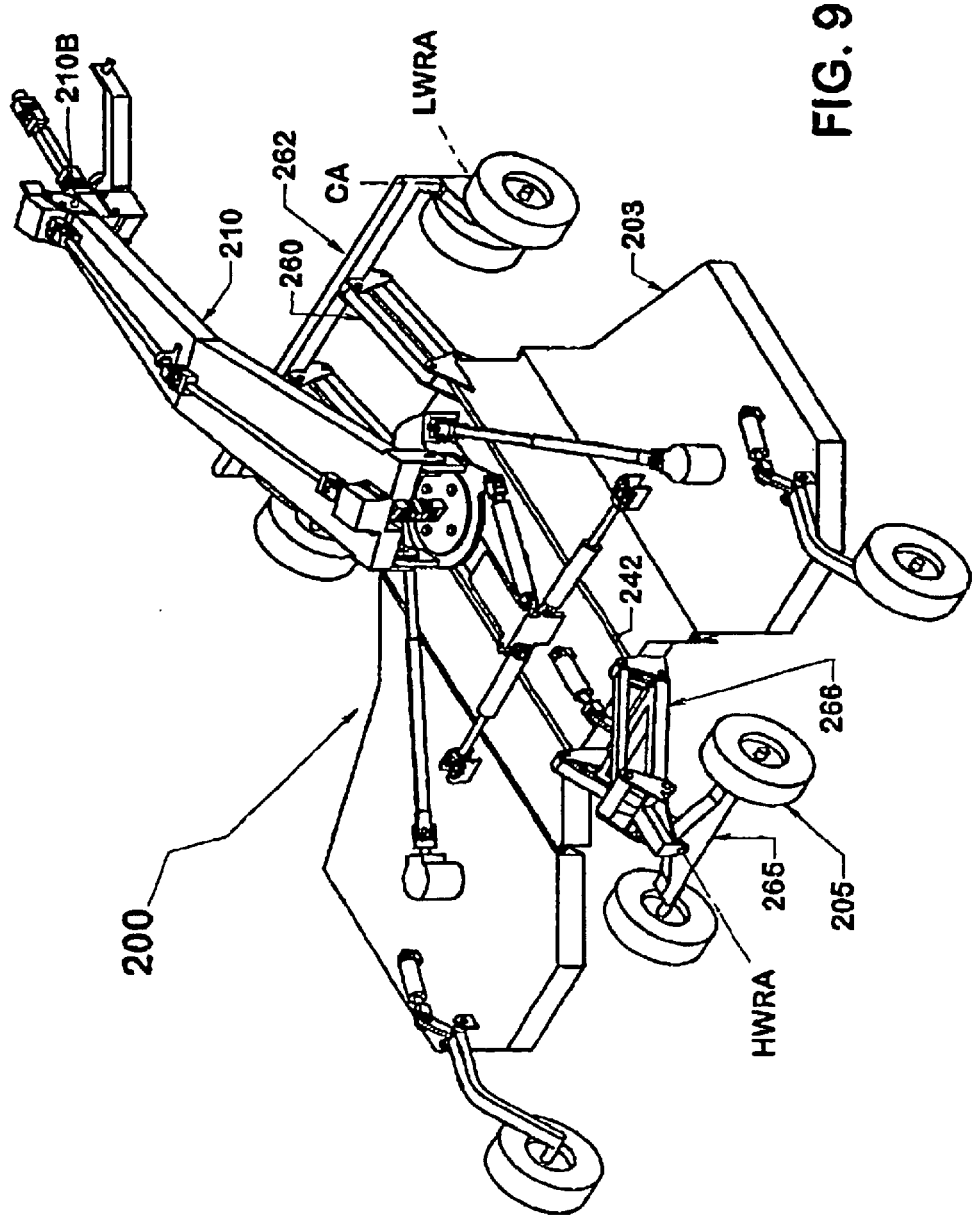
FIG. 9 is a perspective view of an alternate embodiment wherein the rear of the central deck pivots instead of the front.
Figure 10:
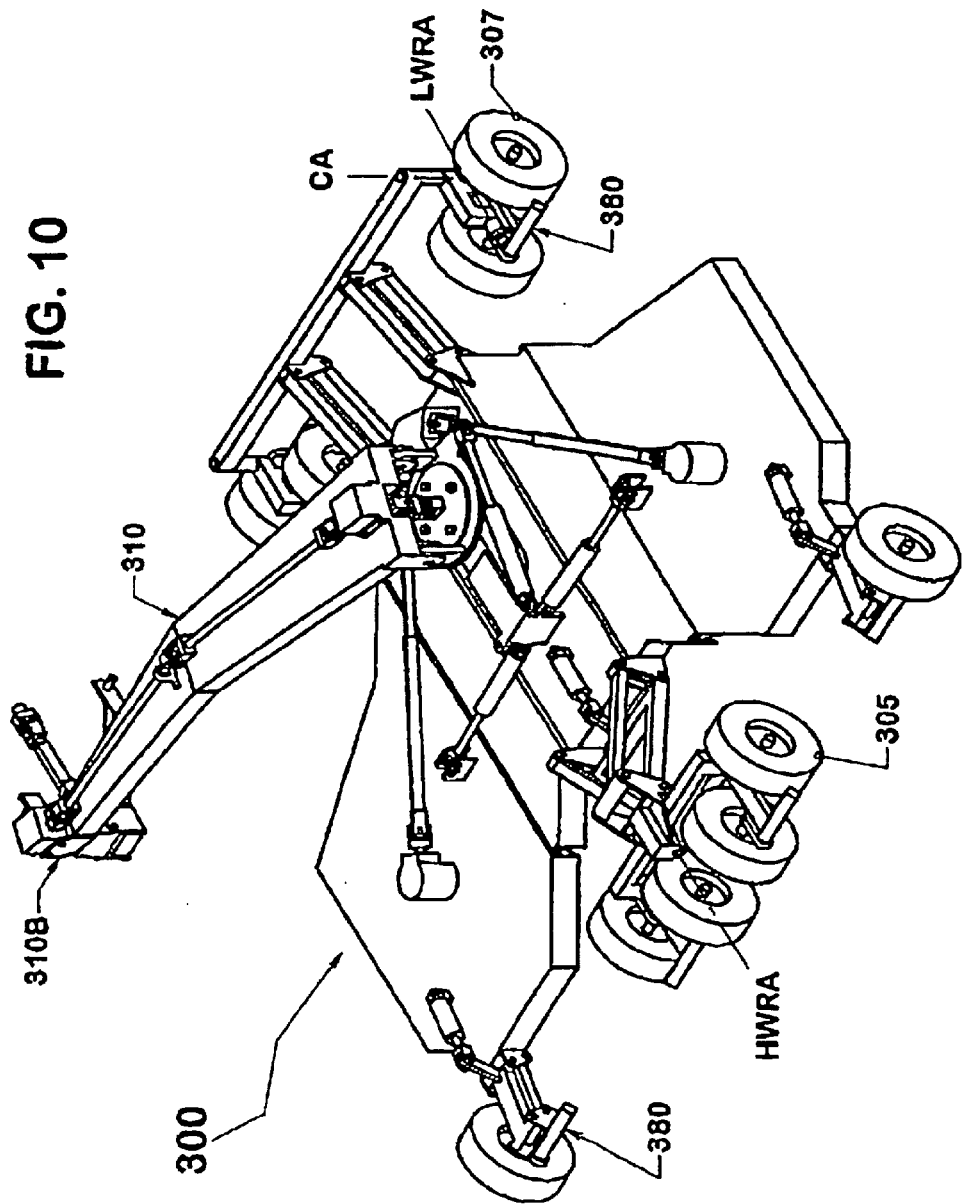
FIG. 10 a perspective view of the embodiment of FIG. 9 with the addition of rubber torsion suspension members mounting each wheel to the apparatus.
Figure 11:
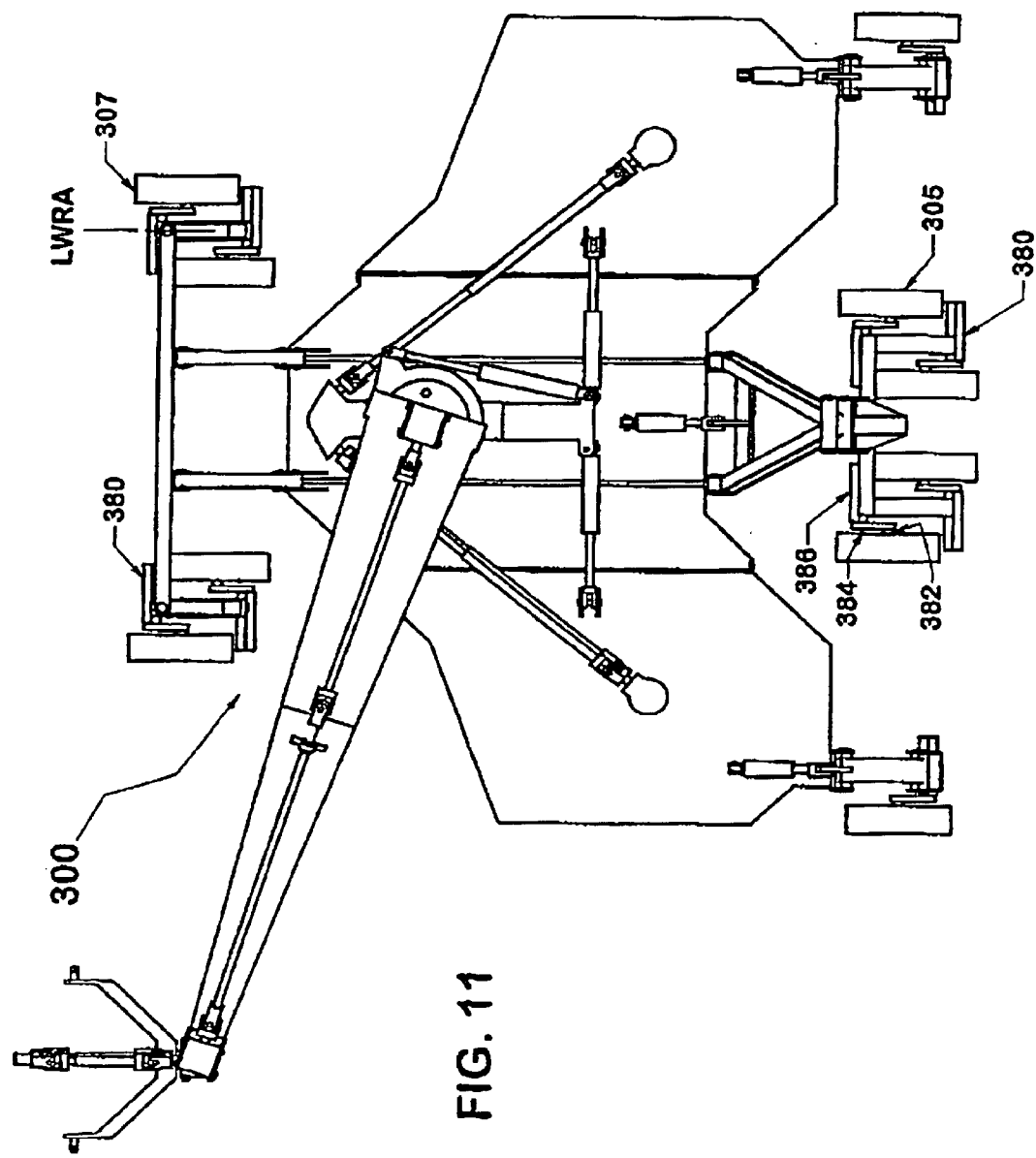
FIG. 11 is a top view of the embodiment of FIG. 10.

The configuration of the front wheels 107 and wheel sets 130 is particularly calculated to provide for the satisfactory operation of the apparatus 100. The walking beam 131 is angled backward on the left side so that the left wheel set 130L is located close to the front end of the left wing deck 103L for enhanced ground following. This backward angle also means that the walking beam 131 passes under the floating hitch member 110 closer to the horizontal mower axis HMA. The up and down range of motion of the floating hitch member 110 at a location closer to the axis HMA is less than the range at a location farther away from the axis HMA. Thus the risk of contact between the floating hitch member 110 and the walking beam 131 is reduced. Alternate embodiments that also improve clearance are illustrated in FIGS. 9, 10, and 11.

The left side of the walking beam 131 also extends far enough so that the left wheel set 130L rolls along the ground in front of the right side of the left wing 103L so that the cutting blade of the left wing deck 130L picks up the track of the wheel set 130L. The cutting blade of the left wing 103L rotates in a clockwise direction, viewed from the top, as shown in FIG. 7. The left wheel set 130L pushes vegetation ahead as it rolls along the ground, and the cutting blade is moving backward over the pushed down vegetation, and thereby picks the vegetation up to cut it better. If the cutting blade is moving in the same direction that the vegetation is pushed down, the cutting blade will skip over the vegetation without cutting it.

On the opposite right side, the walking beam 131 is angled forward and is shorter than on the left side. This positions the right wheel set 130R close to the front of the wheel mount 135, which is the farthest forward end of the apparatus 100. The right wheel set 130R is thus positioned to prevent the wheel mount 135 from digging into a sharp slope or the like.

The right wheel set 13 OR is also positioned so that the following cutting blades of the central mower deck 103 and right wing deck 103R can similarly pick up the track of the wheel set 13 OR since the cutting blade of the central mower deck 103 rotates clockwise and that of the right wing deck 103R rotates counter-clockwise as seen in FIG. 7.

To facilitate turns, the front wheel sets 130 are pivotally attached to the walking beam 131 about vertical caster axes CA. In order to improve the ground following capabilities of the apparatus 100 the wheel sets 130 are further offset on a wheel beam pivotally mounted to the caster bracket 134 about a substantially horizontal wheel rocking axis WRA oriented substantially perpendicular to the operating travel direction T.

The embodiment of FIGS. 6 and 7 further comprises actuators 140 operative to move the rear wheels 105 up and down to thereby raise and lower rear ends of the mower decks 103, 103R, 103L. Linkage arms 142 connect the rear central rockshaft 144 and the front rockshaft 145 so that the front and rear wheels 107, 105 and the front and rear ends of the mower decks 103, 103R, 103L move up and down substantially in concert. The front wheel mount 135 also comprises a parallel linkage 147 such that the horizontal walking axis HWA is maintained substantially horizontal and the caster axes CA of the front wheels 107 are maintained substantially vertical as the mower deck 3 moves up and down, maintaining optimum performance of the front wheel assembly as the mower deck 3 moves up and down.

Again, as an alternative to a hydraulic drive, a mechanical drive is provided for connection to the tractor and operative to transfer power from the tractor to rotate the cutting blade elements. The drive is the same as that described above for the embodiment of FIGS. 1–4, and schematically illustrated in FIG. 5, and as discussed above.

FIGS. 9 and 10 illustrate alternate wheel mounting arrangements that can be used to improve clearance between the wheels and the floating hitch member as the floating hitch member moves up and down. Both embodiments also illustrate a floating hitch member 210,310 that is bent down from a mid-point to the tow end 210B, 310B thereof, also increasing clearance. In the embodiment of FIGS. 6 and 7, the front wheels 107 pivoted about a horizontal walking axis HWA with respect to the central mower deck 103, while the rear wheels 105 are fixed with respect to the central mower deck 103.

In the embodiment of FIG. 9, front parallel linkages 260 are pivotally attached at rear ends thereof to opposite sides of the central mower deck 203 and at front ends thereof to a cross member 262. Front tandem wheels 207 are mounted to front wheel assemblies that rotate about a longitudinal wheel rocking axis LWRA, and that caster about a caster axis CA. This cross member 262 does not pivot with respect to the central mower deck 203, and the right and left ends of the cross member 262 do not move up and down in such a manner that they might contact the floating hitch member 210, as do the ends of the walking beam 131 in FIGS. 6 and 7. The front tandem wheels 207 are offset fore and aft and can rock about the longitudinal wheel rocking axis LWRA to follow contours in the terrain.

To allow the central mower deck 203 of the embodiment of FIG. 9 to rock from side to side to follow the ground and provide a satisfactory cut, the rear wheels 205 are mounted on a rear axle 265 that pivots about a horizontal rear walking axis HRWA, rather than having the front of the deck pivot about the horizontal walking axis HWA as in FIGS. 6 and 7. The rear axle 265 is connected to the central mower deck 203 by a pair of rear parallel linkages 266 that are connected to the front parallel linkages by linkage arms 242 such that the front and rear wheels 107, 105 move up and down in concert, and the caster axes CA are maintained substantially vertical so that proper castering action occurs.

In the embodiment of FIGS. 10 and 11 all wheels 305, 307 have been mounted on rubber torsion suspension members 380. These suspension members 380 comprise an axle 382 on which the wheel is mounted. The opposite end of the axle 382 is attached to a perpendicular arm 384 which is in turn attached to perpendicular shaft that is inserted into a housing 386 filled with rubber that is attached to the assembly as shown. Rotation of the shaft is resisted by the rubber, and a spring effect is provided. Use of the rubber torsion suspension members 380 provides a very simple and effective suspension system compared to the prior art of springs and the like. A smooth ride is provided for the mower decks on rough ground and at higher speeds. The particular configuration shown provides offset tandem wheel arrangements that will support a heavy mower in operating or transport positions.

The invention thus provides rotary mower apparatus where the offset of the mower path from the tractor path may be varied simply by pivoting the floating hitch member with respect to the mower deck from the tractor seat. The apparatus can be provided with single or multiple mower decks. Where required, a mechanical driveline can be readily incorporated into the apparatus.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A rotary mower apparatus adapted for attachment to a tractor for towing along the ground in an operating travel direction, the apparatus comprising:
   a mower deck;
   a plurality of rear wheels mounted behind the mower deck and at least one front wheel mounted ahead of the mower deck such that the mower deck tides along the ground on the wheels;

a cutting blade element rotatably mounted under the mower dock so as to rotate about a substantially vertical blade axis;

a floating hitch member pivotally attached at a mower end thereof to a top portion of the mower deck so as to pivot about a substantially vertical mower axis, and about a substantially horizontal mower axis oriented transversely to the floating hitch member wherein the horizontal mower axis intersects the vertical mower axis at a point above the mower deck, and adapted for pivotal attachment at a tow end thereof to the tractor about a substantially vertical tow axis, the attachment at the ends of the floating hitch member further allowing the floating hitch member and mower deck to float with respect to the tractor to follow contours of the ground;

a drive adapted for connection to the tractor and operative to transfer power from the tractor to rotate the cutting blade clement;

a mower angle control operative to selectively pivot the floating hitch member about the vertical mower axis with respect to the mower deck;

wherein the drive comprises a lower vertical drive shaft having a rotational axis coincidental with the vertical mower axis and operatively connected at a bottom end thereof to the cutting blade element, and an upper vertical drive shaft connected at a bottom end thereof to a top end of the lower vertical drive shaft by a double universal joint, and wherein the horizontal mower axis is located substantially in the center of the double universal joint.

2. The apparatus of claim 1 wherein:

a top end of the upper vertical drive shaft is connected to an output end of an angle gearbox attached to the floating hitch member;

a lateral drive shaft is connected at a mower end thereof to an input end of the angle gearbox;

the lateral drive shalt is substantially aligned with the floating hitch member; and the lateral drive shaft is adapted at a tow end thereof for pivotal connection to a power output shaft of the tractor.

3. The apparatus of claim 1 wherein the tow end of the floating hitch is further adapted for pivotal attachment to the tractor about a substantially horizontal longitudinal tow axis oriented substantiality parallel to the operating travel direction, and about a substantially horizontal transverse tow axis oriented substantially perpendicular to the operating travel direction.

4. The apparatus of claim 1 wherein the vertical mower axis is located on a center-line of the mower deck.

5. The apparatus of claim 1 wherein the vertical blade axis is aligned with the lower vertical drive shaft.

6. The apparatus of claim 1 wherein the apparatus further comprises a tow angle adjuster operative to selectively pivot the floating bitch member about the vertical tow axis.

7. The apparatus of claim 6 wherein the front wheels are caster wheels.

8. The apparatus of claim 1 further comprising an actuator operative to move the rear wheels up and down to thereby raise and lower a rear end of the mower deck, and a linkage connecting the front and rear wheels such that the front end of the mower deck moves up and down substantially in concert with the rear end of the mower deck.

9. A rotary mower apparatus adapted for attachment to a tractor for towing along the pound in an operating travel direction, the apparatus comprising:

a central mower deck and right and left wing mower decks pivotally attached to respective right and left sides of the central mower deck;

a plurality of rear wheels mounted behind the mower decks and at least one from wheel mounted to a front end of the central mower deck such that the mower decks ride along the ground on the wheels;

a cutting blade element rotatably mounted under each mower deck so as to rotate about right, left, and central substantially vertical blade axes;

a floating bitch member pivotally attached at a mower end thereof to a top portion of the central mower deck so as to pivot about a substantially vertical mower axis and about a substantially horizontal mower axis oriented transversely to the floating hitch member wherein the horizontal mower axis intersects the vertical mower axis at a point above the mower deck, and adapted for pivotal attachment at a tow end thereof to the tractor about a substantially vertical tow axis, the attachment at the ends of the floating hitch member further allowing the floating hitch member and mower decks to float with respect to the tractor to follow contours of the ground;

a drive adapted for connection to the tractor and operative to transfer power from the tractor to rotate the cutting blade elements;

a mower angle control operative to selectively pivot the floating hitch member about the vertical mower axis with respect to the central mower deck;

wherein the drive comprises a lower vertical drive shaft having a rotational axis coincidental with the vertical mower axis and operatively connected at a bottom end thereof to the cutting blade elements, and an upper vertical drive shaft connected at a bottom end thereof to a top end of the lower vertical drive shaft by a double universal joint, and wherein the horizontal mower axis is located substantially in the center of the double universal joint.

10. The apparatus of claim 9 wherein: a top end of the upper vertical drive shaft is connected to an output end of an angle gearbox attached to the floating hitch member; a lateral drive shaft is connected at a mower end thereof to an input end of the angle gearbox; the lateral drive shalt is substantially aligned with the floating hitch member; and the lateral drive shaft is adapted at a tow end thereof for pivotal connection to a power output shaft of the tractor.

11. The apparatus of claim 9 wherein the tow end of the floating hitch is further adapted for pivotal attachment to the tractor about a substantially horizontal longitudinal tow axis oriented substantially parallel to the operating travel direction, and about a substantially horizontal transverse tow axis oriented substantially perpendicular to the operating travel direction.

12. The apparatus of claim 9 wherein the central vertical blade axis is aligned with the lower vertical drive shaft.

13. A rotary mower apparatus adapted for attachment to a tractor for towing along the ground in an operating travel direction, the apparatus comprising:

a central mower deck and right and left wing mower decks pivotally attached to respective right and left sides of the central mower deck;

a plurality of rear wheels mounted behind the mower decks and at least one front wheel mounted to a front end of the central mower deck such that the mower decks ride along the ground on the wheels;

a cutting blade element rotatably mounted under each mower deck so as to rotate about right, left, and central substantially vertical blade axes;

a floating hitch member pivotally attached at a mower end thereof to a top portion of the central mower deck so as to pivot about a substantially vertical mower axis, and adapted for pivotal attachment at a tow end thereof to the tractor about a substantially vertical tow axis, the attachment at the ends of the floating hitch member further allowing the floating hitch member and mower decks to float with respect to the tractor to follow contours of the ground;

a drive adapted for connection to the tractor and operative to transfer power from the tractor to rotate the cutting blade elements:

a mower angle control operative to selectively pivot the floating bitch member about the vertical mower axis with respect to the central mower deck;

wherein the central mower deck is supported at a front end thereof by first and second front wheels attached to first and second ends of a walking beam, and wherein the walking beam is pivotally attached to the front end of the central mower deck about a substantially horizontal walking axis oriented substantiality parallel to the operating travel direction.

14. The apparatus of claim 13 wherein the first and second front wheels are pivotally attached to the walking beam about respective first and second substantially vertical caster axes.

15. The apparatus of claim 14 wherein the walking beam is angled back an a first side thereof such that the first wheel is located in proximity to a front end of the left wing mower deck.

16. The apparatus of claim 15 wherein the second wheel is located in proximity to a forward end of the apparatus and ahead of the central mower deck.

17. The apparatus of claim 14 further comprising offset fore and aft tandem front wheel assemblies pivotally attached to the walking beam about a substantially horizontal rocking axis oriented substantially perpendicular to the operating travel direction.

18. A rotary mower apparatus adapted for attachment to a tractor for towing along the ground in an operating travel direction, the apparatus comprising:

a central mower deck and right and left wing mower decks pivotally attached to respective right and left sides of the central mower deck;

a plurality of rear wheels mounted behind the mower decks and at least one front wheel mounted to a front end of the central mower deck such that the mower decks ride along the ground on the wheels;

a cutting blade element rotatably mounted under each mower deck so as to rotate about right, left, and central substantially vertical blade axes;

a floating hitch member pivotally attached at a mower end thereof to a top portion of the central mower so as to pivot about a substantially vertical mower axis, and adapted for pivotal attachment at a tow end thereof to the tractor about a substantially vertical tow axis, the attachment at the ends of the floating hitch member further allowing the floating hitch member and mower decks to float with respect to the tractor to follow contours of the ground;

a drive adapted for connection to the tractor and operative to transfer power from the tractor to rotate the cutting blade elements;

a mower angle control operative to selectively pivot the floating hitch member about the vertical mower axis with respect to the central mower deck;

wherein the central mower deck is supported at the front end thereof by castering first and second front wheels attached to first and second ends of a substantially horizontal cross member, and wherein the cross member is attached to the front end of the central mower deck by a front parallel linkage attached to each side of the front end of the central mower deck.

19. The apparatus of claim 18 wherein the central mower deck is supported at the rear end thereof by first and second rear wheels attached to first and second ends of a substantially horizontal rear axle that is pivotally mounted with respect to the central mower deck about a substantially horizontal rear walking axis oriented substantially parallel with the operating travel direction.

20. The apparatus of claim 19 wherein the rear axle is connected to the central mower deck by a pair of rear parallel linkages that are connected to the front parallel linkages by linkage arms, and wherein an actuator operates to move the front and rear wheels up and down in concert, and caster axes of the front wheels are maintained substantially vertical.

21. The apparatus of claim 18 wherein each front wheel further comprises a pair of tandem wheels oriented in an offset fore and aft relationship and pivotable about a substantially horizontal longitudinal wheel rocking axis oriented substantially parallel to the operating travel direction.

22. The apparatus of claim 21 wherein one of the tandem wheels is mounted on a rubber torsion suspension member that extends laterally behind the other of the tandem wheels.

23. The apparatus of claim 18 wherein it least one wheel is mounted on a rubber torsion suspension member.

24. The apparatus of claim 23 wherein the at least one wheel comprises a pair of tandem wheels oriented in an offset fore and aft relationship, and wherein one of the tandem wheels is mounted on a rubber torsion suspension member that extends laterally behind the other of the tandem wheels.

25. A rotary mower apparatus adapted for attachment to a tractor for towing along the ground in an operating travel direction, the apparatus comprising:

a central mower deck and right and left wing mower decks pivotally attached to respective right and left sides of the central mower deck;

a plurality of rear wheels mounted behind the mower decks and at least one front wheel mounted to a front end of the central mower deck such that the mower decks ride along the ground on the wheels;

a cutting blade element rotatably mounted under each mower deck so as to rotate about right, left, and central substantially vertical blade axes;

a floating hitch member pivotally attached at a mower end thereof to a top portion of the central mower deck so as to pivot about a substantially vertical mower axis located substantially on a center-line of the central mower deck, and adapted for pivotal attachment at a tow end thereof to the tractor about a substantially vertical tow axis, the attachment at the ends of the floating hitch member further allowing the floating hitch member and mower decks to float with respect to the tractor to follow contours of the ground;

a drive adapted for connection to the tractor and operative to transfer power from the tractor to rotate the cutting blade elements; and a mower angle control operative to selectively pivot the floating hitch member about the vertical mower axis with respect to the central mower deck;

wherein the mower end of the floating hitch member is pivotally attached to the mower deck about a substantially horizontal mower axis oriented transversely to the floating hitch member.

26. The apparatus of claim 25 wherein the horizontal mower axis intersects the vertical mower axis at a point above the mower deck.

27. A rotary mower apparatus adapted for attachment to a tractor for towing along the ground in an operating travel direction, the apparatus comprising:

a central mower deck and right and left wing mower decks pivotally attached to respective right and left sides of the central mower deck;

a plurality of rear wheels mounted behind the mower decks and at least one front wheel mounted to a front end of the central mower deck such that the mower decks ride along the ground on the wheels;

a cutting blade element rotatably mounted under each mower deck so as to rotate about right, left, and central substantially vertical blade axes;

a floating hitch member pivotally attached at a mower end thereof to a top portion of the central mower deck so as to pivot about a substantially vertical mower axis located substantially on a center-line of the central mower deck, and adapted for pivotal attachment at a tow end thereof to the tractor about a substantially vertical low axis, the attachment at the ends of the floating hitch member further allowing the floating hitch member and mower decks to float with respect to the tractor to follow contours of the ground;

a drive adapted for connection to the tractor and operative to transfer power from the tractor to rotate the cutting blade elements, wherein the drive comprises a lower vertical drive shaft having a rotational axis coincidental with the vertical mower axis and operatively connected at a bottom end thereof to the cutting blade element, and an upper vertical drive shaft connected at a bottom cud thereof to a top end of the lower vertical drive shaft by a double universal joint, and wherein the horizontal mower axis is located substantially in the center of the double universal joint; and a mower angle control operative to selectively pivot the floating hitch member about the vertical mower axis with respect to the central mower deck.

28. The apparatus of claim 27 wherein:

a top end of the upper vertical drive shaft is connected to an output end of an angle gearbox attached to the floating hitch member;

a lateral drive shaft is connected at a mower end thereof to an input end of the angle gearbox;

the lateral drive shaft is substantially aligned with the floating hitch member, and the lateral drive shaft is adapted at a tow end thereof for pivotal connection to a power output shaft of the tractor.

29. A rotary mower apparatus adapted for attachment to a tractor for towing along the ground in an operating travel direction, the apparatus comprising:

a central mower deck and right and left wing mower decks pivotally attached to respective right and left sides of the central mower deck;

a plurality of rear wheels mounted behind the mower decks and at least one front wheel mounted to a front end of the central mower deck such that the mower decks ride along the ground on the wheels;

a cutting blade element rotatably mounted under each mower deck so as to rotate about right, left, and central substantially vertical blade axes;

a floating hitch member pivotally attached at a mower end thereof to a top portion of the central mower deck so as to pivot about a substantially vertical mower axis located substantially on a center-line of the central mower deck, and adapted for pivotal attachment at a tow end thereof to the tractor about a substantially vertical tow axis, the attachment at the ends of the floating hitch member further allowing the floating hitch member and mower decks to float with respect to the tractor to follow contours of the ground wherein the tow end of the floating hitch is further adapted for pivotal attachment to the tractor about a substantially horizontal longitudinal tow axis oriented substantially parallel to the operating travel direction, and about a substantially horizontal transverse tow axis oriented substantially perpendicular to the operating travel direction;

a drive adapted for connection to the tractor and operative to transfer power from the tractor to rotate the cutting blade elements; and a mower angle control operative to selectively pivot the floating hitch member about the vertical mower axis with respect to the central mower deck.

* * * * *

UNITED STATES PATENT AND TRADEMARK OFFICE
CERTIFICATE OF CORRECTION

PATENT NO. : 6,854,250 B2
APPLICATION NO. : 10/274560
DATED : February 15, 2007
INVENTOR(S) : Stanley Joseph Boyko It is certified that error appears in the above-identified patent and that said Letters Patent is hereby corrected as shown below:

COLUMN 5
Line 62, replace "mourned" with -- mounted --

COLUMN 7
Line 23, replace "13 OR" with -- 130R --
Line 26, replace "13 OR" with -- 130R --

COLUMN 8
Line 7, replace "This" with -- Thus --
Line 66, replace "tides" with -- rides --

COLUMN 9
Line 2, replace "dock" with -- deck --
Line 18, replace "clement" with -- element --
Line 36, replace "shalt" with -- shaft --
Line 44, replace "substantiality" with -- substantially --
Line 54, replace "bitch" with -- hitch --
Line 63, replace "pound" with -- ground --

COLUMN 10
Line 2, replace "from" with -- front --
Line 8, replace "bitch" with -- hitch --
Line 40, replace "shalt" with -- shaft --

COLUMN 11
Line 12, replace "bitch" with -- hitch --

UNITED STATES PATENT AND TRADEMARK OFFICE
CERTIFICATE OF CORRECTION

PATENT NO. : 6,854,250 B2
APPLICATION NO. : 10/274560
DATED : February 15, 2007
INVENTOR(S) : Stanley Joseph Boyko It is certified that error appears in the above-identified patent and that said Letters Patent is hereby corrected as shown below:

COLUMN 13
Line 37, replace "cud" with -- end --

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 6,854,250 B2
APPLICATION NO. : 10/274560
DATED : February 15, 2005
INVENTOR(S) : Stanley Joseph Boyko It is certified that error appears in the above-identified patent and that said Letters Patent is hereby corrected as shown below:

COLUMN 5
Line 62, replace "mourned" with -- mounted --

COLUMN 7
Line 23, replace "13 OR" with -- 130R --
Line 26, replace "13 OR" with -- 130R --

COLUMN 8
Line 7, replace "This" with -- Thus --
Line 66, replace "tides" with -- rides --

COLUMN 9
Line 2, replace "dock" with -- deck --
Line 18, replace "clement" with -- element --
Line 36, replace "shalt" with -- shaft --
Line 44, replace "substantiality" with -- substantially --
Line 54, replace "bitch" with -- hitch --
Line 63, replace "pound" with -- ground --

COLUMN 10
Line 2, replace "from" with -- front --
Line 8, replace "bitch" with -- hitch --
Line 40, replace "shalt" with -- shaft --

COLUMN 11
Line 12, replace "bitch" with -- hitch --

UNITED STATES PATENT AND TRADEMARK OFFICE
CERTIFICATE OF CORRECTION

PATENT NO. : 6,854,250 B2
APPLICATION NO. : 10/274560
DATED : February 15, 2005
INVENTOR(S) : Stanley Joseph Boyko It is certified that error appears in the above-identified patent and that said Letters Patent is hereby corrected as shown below:

COLUMN 13
Line 37, replace "cud" with -- end --

This certificate supersedes Certificate of Correction issued November 27, 2007.

Signed and Sealed this

Twenty-fifth Day of December, 2007

JON W. DUDAS
*Director of the United States Patent and Trademark Office*